(12) United States Patent
Beall et al.

(10) Patent No.: US 8,444,752 B2
(45) Date of Patent: May 21, 2013

(54) PARTICULATE FILTERS AND METHODS OF FILTERING PARTICULATE MATTER

(75) Inventors: Douglas Munroe Beall, Painted Post, NY (US); Achim Karl-Erich Heibel, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 661 days.

(21) Appl. No.: 12/604,014

(22) Filed: Oct. 22, 2009

(65) Prior Publication Data

US 2011/0048227 A1 Mar. 3, 2011

Related U.S. Application Data

(60) Provisional application No. 61/238,362, filed on Aug. 31, 2009.

(51) Int. Cl.
*B01D 46/00* (2006.01)
*B01D 50/00* (2006.01)
*B01D 24/00* (2006.01)
*B01D 39/00* (2006.01)
*B01D 39/06* (2006.01)
*B01D 39/14* (2006.01)
*B01D 39/20* (2006.01)

(52) U.S. Cl.
USPC .......... 95/273; 55/522; 55/523; 55/524; 422/169; 422/170; 422/171; 422/172; 422/177; 422/178; 422/179; 422/180; 422/181; 422/182

(58) Field of Classification Search
USPC 55/522–524; 422/169–172, 177–182; 95/273
See application file for complete search history.

(56) References Cited

U.S. PATENT DOCUMENTS

| 4,455,180 | A | 6/1984 | Hillman et al. |
| 6,544,310 | B2 * | 4/2003 | Badeau et al. ............... 55/385.3 |
| 6,673,414 | B2 | 1/2004 | Ketcham et al. |
| 6,843,822 | B2 * | 1/2005 | Beall et al. ....................... 55/523 |
| 7,056,365 | B2 * | 6/2006 | Ichikawa et al. ............... 55/523 |
| 7,211,226 | B2 | 5/2007 | Liu et al. |
| 7,238,217 | B2 * | 7/2007 | Cutler et al. .................... 55/523 |
| 7,451,849 | B1 | 11/2008 | Zuberi et al. |
| 7,491,373 | B2 | 2/2009 | Ketcham et al. |
| 7,806,956 | B2 * | 10/2010 | Anderson et al. ............... 55/523 |

(Continued)

FOREIGN PATENT DOCUMENTS

| EP | 1 598 534 | 11/2005 |
| GB | 2 342 055 | 4/2000 |

(Continued)

*Primary Examiner* — Amber Orlando
(74) *Attorney, Agent, or Firm* — Matthew B. McNutt

(57) ABSTRACT

A particulate filter may comprise an inlet end, an outlet end, and a plurality of parallel channels disposed and configured to flow fluid from the inlet end to the outlet end, the channels being defined by a plurality of porous walls configured to trap particulate matter. The particulate filter may define at least one filtration region including a first group of channels and at least one bypass region including a second group of channels, wherein at least some of the channels in the first group of channels are plugged at an end thereof, wherein the channels in the second group of channels are unplugged, and wherein greater than or equal to about 70% of the plurality of parallel channels are plugged at an end thereof.

23 Claims, 4 Drawing Sheets

U.S. PATENT DOCUMENTS

| | | | |
|---|---|---|---|
| 7,892,309 B2* | 2/2011 | Okazaki et al. | 55/523 |
| 2002/0078667 A1* | 6/2002 | Ishihara et al. | 55/282.3 |
| 2004/0161373 A1 | 8/2004 | Ichikawa et al. | |
| 2004/0258582 A1* | 12/2004 | Miwa et al. | 422/177 |
| 2005/0235622 A1* | 10/2005 | Cutler et al. | 55/523 |
| 2008/0072551 A1 | 3/2008 | Zuberi | |
| 2008/0110341 A1 | 5/2008 | Ketcham et al. | |
| 2008/0120968 A1 | 5/2008 | Beall et al. | |
| 2008/0155952 A1* | 7/2008 | Okazaki et al. | 55/523 |
| 2009/0031702 A1* | 2/2009 | Robel | 60/274 |
| 2009/0056546 A1 | 3/2009 | Bazyn et al. | 95/273 |
| 2009/0139193 A1 | 6/2009 | Garcia et al. | |
| 2011/0132194 A1* | 6/2011 | Ahmed et al. | 95/273 |

FOREIGN PATENT DOCUMENTS

| | | |
|---|---|---|
| WO | 2006/125516 | 11/2006 |
| WO | 2009/020693 | 2/2009 |
| WO | 2009/148498 | 12/2009 |

* cited by examiner

PARTICULATE FILTERS AND METHODS OF FILTERING PARTICULATE MATTER

CROSS-REFERENCE TO RELATED APPLICATIONS

This application claims the benefit of priority to U.S. provisional application No. 61/238,362, filed on Aug. 31, 2009.

TECHNICAL FIELD

The present teachings generally relate to particulate filters and methods of filtering particulate matter. More specifically, the present teachings relate to particulate filters for trapping and combusting particulates contained in engine exhaust gas.

BACKGROUND

Environmental concerns have motivated the implementation of emission requirements for internal combustion engines throughout much of the world. Catalytic converters have been used to eliminate many of the pollutants present in exhaust gas; however, a filter is often required to remove particulate matter, such as, for example, ash and soot. Wall-flow particulate filters, for example, are often used in engine systems to remove particulates from the exhaust gas. Such wall-flow particulate filters may be made of a substrate having a plurality of parallel flow channels (sometimes referred to as cells) defined by internal porous walls. Inlet and/or outlet ends of the flow channels may be selectively plugged, such as, for example, in a checkerboard pattern, so that exhaust gas, once inside the substrate channels, is forced to pass through the internal porous walls, whereby the porous walls retain a portion of the particulates in the exhaust gas.

In this manner, wall-flow particulate filters have been found to be effective in removing particulates, such as, for example, ash and soot, from exhaust gas. However, the pressure drop across a wall-flow particulate filter generally increases as the amount of particulates trapped in the porous walls and channels increases. The increasing pressure drop results in a gradual rise in back pressure against the engine, and a corresponding decrease in the performance of the engine. Accordingly, soot is commonly oxidized and removed in a controlled regeneration process (i.e., active regeneration) before excessive levels have accumulated.

Numerous engine systems, such as, for example, retrofit systems, off-road diesel systems and gasoline systems, however, may lack the sophisticated controls, accurate soot load estimation schemes and advanced regeneration strategies to regulate the pressure drop produced by the particulate load on a particulate filter through controlled regeneration. Accordingly, in such systems, to avoid soot-overloading, which can damage the filter, engine, and/or after-treatment system, it may be desirable to provide a particulate filter that exhibits a relatively low pressure drop at low soot loads. It may further be desirable to provide a particulate filter that allows particulate matter to bypass being trapped by the filter at high soot loads, until the filter can be regenerated naturally under normal driving conditions (i.e., via passive regeneration).

SUMMARY

The present teachings may solve one or more of the above-mentioned problems and/or may demonstrate one or more of the above-mentioned desirable features. Other features and/or advantages may become apparent from the description that follows.

In accordance with various exemplary embodiments of the present teachings, a particulate filter may comprise an inlet end, an outlet end, and a plurality of parallel channels disposed and configured to flow fluid from the inlet end to the outlet end, the channels being defined by a plurality of porous walls configured to trap particulate matter. The particulate filter may define at least one filtration region including a first group of channels and at least one bypass region including a second group of channels, wherein at least some of the channels in the first group of channels are plugged at an end thereof, wherein the channels in the second group of channels are unplugged, and wherein greater than or equal to about 70% of the plurality of parallel channels are plugged at an end thereof.

In accordance with various additional exemplary embodiments of the present teachings, a method of filtering particulate matter may comprise flowing fluid through a particulate filter comprising an inlet end, an outlet end, and a plurality of parallel channels disposed and configured to flow fluid from the inlet end to the outlet end, the channels being defined by a plurality of porous walls configured to trap particulate matter, wherein a majority of the fluid flows through at least one first region of the particulate filter when the particulate filter has a particulate matter load level ranging from about 0 g/l to less than about 0.5 g/l, and wherein a majority of the fluid flows through at least one second region of the particulate filter that differs from the at least one first region when the particulate filter has a particulate matter load level of greater than or equal to about 5 g/l.

Additional objects and advantages will be set forth in part in the description which follows, and in part will be obvious from the description, or may be learned by practice of the present teachings. The objects and advantages may be realized and attained by means of the elements and combinations particularly pointed out in the appended claims.

It is to be understood that both the foregoing general description and the following detailed description are exemplary and explanatory only and are not restrictive of the claims.

BRIEF DESCRIPTION OF THE DRAWINGS

The present teachings can be understood from the following detailed description either alone or together with the accompanying drawings. The drawings are included to provide a further understanding of the present teachings, and are incorporated in and constitute a part of this specification. The drawings illustrate one or more exemplary embodiments and together with the description serve to explain various principles and operation. In the drawings.

DESCRIPTION OF EXEMPLARY EMBODIMENTS

Figure 1:
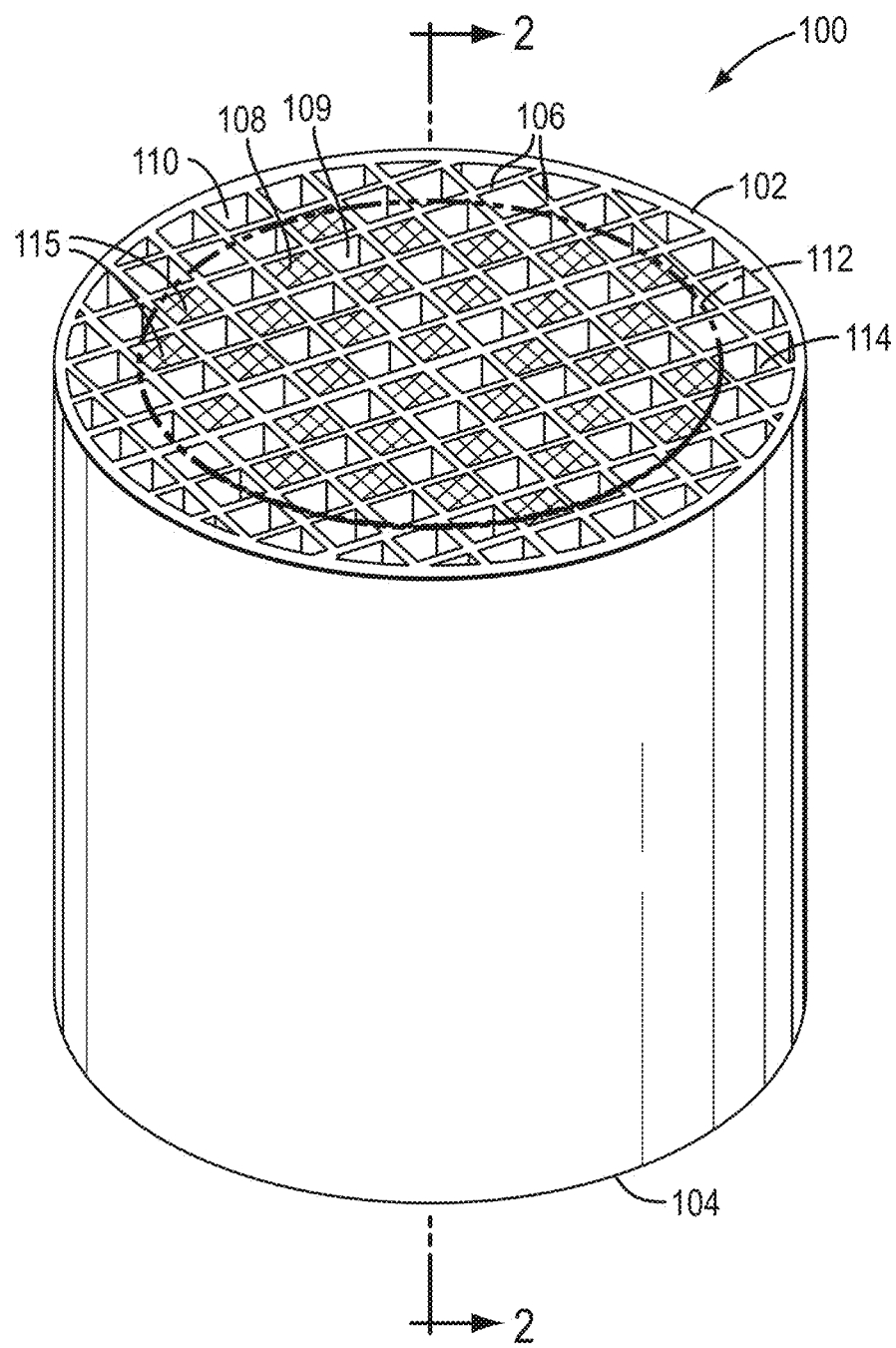
FIG. 1 is a perspective view of one exemplary embodiment of a particulate filter in accordance with the present teachings.

Particulate filters that exhibit high filtration efficiency and a low pressure drop when the filter is relatively clean, followed by low filtration efficiency as the filter becomes dirty, that is, loaded with particulate matter, including, for example soot, are desirable for engine systems lacking the sophisticated controls, strategies and/or space required for active filter regeneration. The present teachings contemplate particulate filter designs that exhibit such properties, including, for example, high initial filtration efficiency and a low clean pressure drop, followed by low filtration efficiency at high particulate loads. Various exemplary embodiments of the present teachings contemplate that by providing low filtration efficiency at high particulate loads, subsequent particulate matter may effectively bypass becoming trapped in the filter, thereby avoiding soot over-loading of the filter until the filter can be passively regenerated under, for example, a vehicle's normal driving conditions.

The present teachings, therefore, contemplate particulate filters configured to both efficiently remove particulate matter from a fluid stream, while also allowing particulate matter to bypass being trapped in the filter at high particulate loads, and methods for using such particulate filters for filtering particulate matter. More specifically, the particulate filters may be configured to trap particulate matter, such as, for example, soot and ash contained in engine exhaust gas, in a filtration region of the filter during one time period, while allowing particulate matter to bypass being trapped by the filter via use of a bypass region of the filter at high soot loads during another time period. In other words, various exemplary embodiments of the present teachings provide particulate filter configurations that include at least one filtration region including a first group of channels and at least one bypass region including a second group of channels. The at least one filtration region, for example, may include plugged channels, which, in an exemplary embodiment may be alternately plugged at the inlet and outlet ends thereof. The at least one filtration region may thus include conventional wall-flow channels, thereby forcing the particulate-laden fluid to flow through the porous walls separating and defining the first group of channels making up the filtration region. On the other hand, the group of channels forming the at least one bypass region may be unplugged through-channels (also referred to as flow-through channels) that allow the particulate-laden fluid to flow straight through the channels (i.e., substantially without flowing through the filter wall), thereby bypassing flow through the porous walls and trapping of the particulate matter in the filter.

In various exemplary embodiments, when the filter is clean, the pressure drop resistance provided by the porous walls is moderate, thereby allowing a significant fraction of fluid flow to take place through the filtration region, which may result in a relatively high filtration efficiency. Over time, however, as particulate matter (e.g., soot and ash) gets deposited within and on the porous walls of the channels in the filtration region, the pressure drop resistance provided by the now particulate-laden walls becomes great enough to divert most of the fluid to flow through the channels in the bypass region of the filter. Consequently, the filter's filtration efficiency may drop significantly and be relatively low at higher particulate loads.

The present teachings, therefore, contemplate that a particulate filter's filtration efficiency and pressure drop behavior with particulate load are a function of the particulate filter's microstructure and geometry. By way of example, the fractional area of the filter's filtration region and bypass region may affect the filtration efficiency and pressure drop behavior of the filter. A filter's microstructural properties, such as, for example, pore size, porosity and/or pore size distribution determined in accordance with various exemplary embodiments of the present teachings may be sufficient to provide a low clean pressure drop across the filter, as well as a high initial filtration efficiency. Additionally, a filter's geometric properties, such as, for example, wall cell density (e.g., cells per square inch (CPSI)), wall thickness, filter length, filter diameter, and/or the relative fractional areas of the filtration region and the bypass region determined in accordance with various further exemplary embodiments of the present teachings may be selected so as to provide relatively high filtration efficiencies at relatively low particulate loads, including when the filter is clean, followed by relatively low filtration efficiencies at relatively high particulate loads.

Various exemplary embodiments mentioned above and described herein represent particulate filters whose microstructure and geometry can produce a low clean pressure drop and a relatively high initial filtration efficiency, followed by a relatively low filtration efficiency at high particulate loads, thereby avoiding soot overloading of the filter when active regeneration is not available.

As used herein, the term "initial filtration efficiency" refers to the filtration efficiency exhibited by a particulate filter when the filter is relatively clean (i.e., prior to excessive particulate loading). Initial filtration efficiency may be defined, for example, as the filtration efficiency exhibited by a particulate filter in a particulate load range of about 0 g/l to less than about 0.5 g/l.

As used herein, the term "particulate filter" or "filter" refers to a structure which is capable of removing particulate matter from a fluid stream passing through the structure. The present teachings may apply to the removal of any particulate matter from any fluid stream, and the fluid stream may be in the form of a gas or a liquid. The gas or liquid may also contain another phase, such as a solid particulate in either a gas or liquid stream, or droplets of liquid in a gas stream. Non-limiting, exemplary fluid streams include exhaust gases produced by internal combustion engines, such as, for example, diesel and gasoline engines, aqueous liquid streams, and coal combustion flue gases produced in a coal gasification process.

The particulate matter may be in any phase. Thus, the particulate matter may be present, for example, as a solid or liquid in a gas fluid stream, or as a solid in a liquid fluid stream. Exemplary particulate matter includes, for instance, diesel particulate matter (e.g. the particulate component of diesel exhaust from diesel cars and trucks), which includes diesel soot and aerosols such as ash particulates, metallic abrasion particles, sulfates, and/or silicates, for example. As used herein, the term "soot" refers to impure carbon particles that result from the incomplete combustion of hydrocarbons during the internal combustion process. The term "ash" refers to non-combustible metallic material that is found in almost all petroleum products. For diesel applications, ash is typically produced from crankcase oil and/or fuel borne catalysts.

As used herein, the term "filtration region" refers to a region of a particulate filter that is configured to filter particulate matter from a fluid stream flowing through the region. A filtration region may be defined by a contiguous group of channels of the particulate filter that are collectively configured to effect filtration of particulate matter, such as, for example, soot and ash, as a fluid stream flows through the channels of the filtration region. The term "bypass region" refers to a region of a particulate filter that is configured to permit a fluid stream flowing through the region to flow through substantially without any filtering of particulate matter from the fluid stream. A bypass region may be defined by a contiguous group of channels of the particulate filter that are collectively configured to flow a fluid stream through the channels such that substantially no filtration of particulate mater from the fluid stream occurs, thereby allowing the fluid to effectively bypass filtration.

Particulate filters of the present teachings can have any shape, size, or geometry suitable for a desired application, as well as a variety of configurations and designs, including, but not limited to, for example, a monolithic structure. Various exemplary embodiments of the present teachings consider, for example, a structure comprising a filtration region that forms either a wall-flow region or a partial-flow region (i.e., any combination of a wall-flow structure and a flow-through structure) of the monolith structure and a bypass region that forms a flow-through region of the monolith structure. Various exemplary embodiments of the present teachings contemplate utilizing the cellular geometry of a honeycomb configuration due to its high surface area per unit volume for deposition of particulate matter. Those having ordinary skill in the art would understand, however, that the cross-section of the cells of a honeycomb structure may have virtually any shape and are not limited to square or hexagonal. Similarly, and as may be further understood from the teachings below, a honeycomb structure may be configured into various separate and/or distinct regions, including, for example, a wall-flow or partial-flow region and a flow-through region.

Those having ordinary skill in the art would further understand that the regions of a particulate filter (i.e., the filtration region and the bypass region) can have any shape or geometry suitable for a particular application, as well as a variety of configurations and designs, including, but not limited to, a configuration wherein the filtration region and the bypass region are disposed concentrically relative to each other. Various exemplary embodiments of the present teachings contemplate, for example, a configuration wherein the bypass region surrounds the filtration region, whereas various additional exemplary embodiments contemplate a configuration wherein the filtration region surrounds the bypass region. Further, it is considered within the scope of the present teachings that a particulate filter may include a plurality of filtration regions and/or a plurality of bypass regions, and those regions may be in a variety of locations within the particulate filter.

FIG. 1 illustrates one exemplary embodiment of a particulate filter suitable for practice of the present teachings. A particulate filter 100 has an inlet end 102 an outlet end 104, and a plurality of parallel channels 108, 109 and 110 extending from the inlet end 102 to the outlet end 104. The channels 108, 109 and 110 are defined by intersecting porous walls 106, thereby forming a generally honeycomb configuration. Although the particulate filter 100 is depicted with channels having a substantially square cross-section (i.e., in a plane perpendicular to a longitudinal axis of the filter 100), those ordinarily skilled in the art would understand that channels 108, 109 and 110 can have various additional geometries, such as, for example, cross-sections that are circular, square, triangular, rectangular, hexagonal, sinusoidal, or any combination thereof, without departing from the scope of the present teachings.

Additionally, although the particulate filter 100 is depicted as cylindrical, those skilled in the art would understand that such shape is exemplary only and particulate filters in accordance with the present teachings may have a variety of shapes and present a variety of differing cross-sections, including, but not limited to, for example, oval, square, rectangular, or triangular cross-sections.

The particulate filter 100 may be made of any suitable material, and the porous walls 106 are not limited to any particular porous material. Exemplary materials include a variety of porous ceramics, including, but not limited to, cordierite, silicon carbide, silicon nitride, aluminum titanate, eucryptite, calcium aluminate, zirconium phosphate, and spondumene. In various exemplary embodiments, the particulate filter 100 may be formed as a monolithic structure, for example, via extruding and/or molding. Those having ordinary skill in the art are familiar with the various techniques for forming such ceramic monolithic structures. Particulate filters may in various exemplary embodiments also include a skin forming an outer peripheral lateral surface of the filter. The skin may be made of the same or a different material than the porous walls, and in various embodiments may be thicker than the porous walls.

Figure 2:
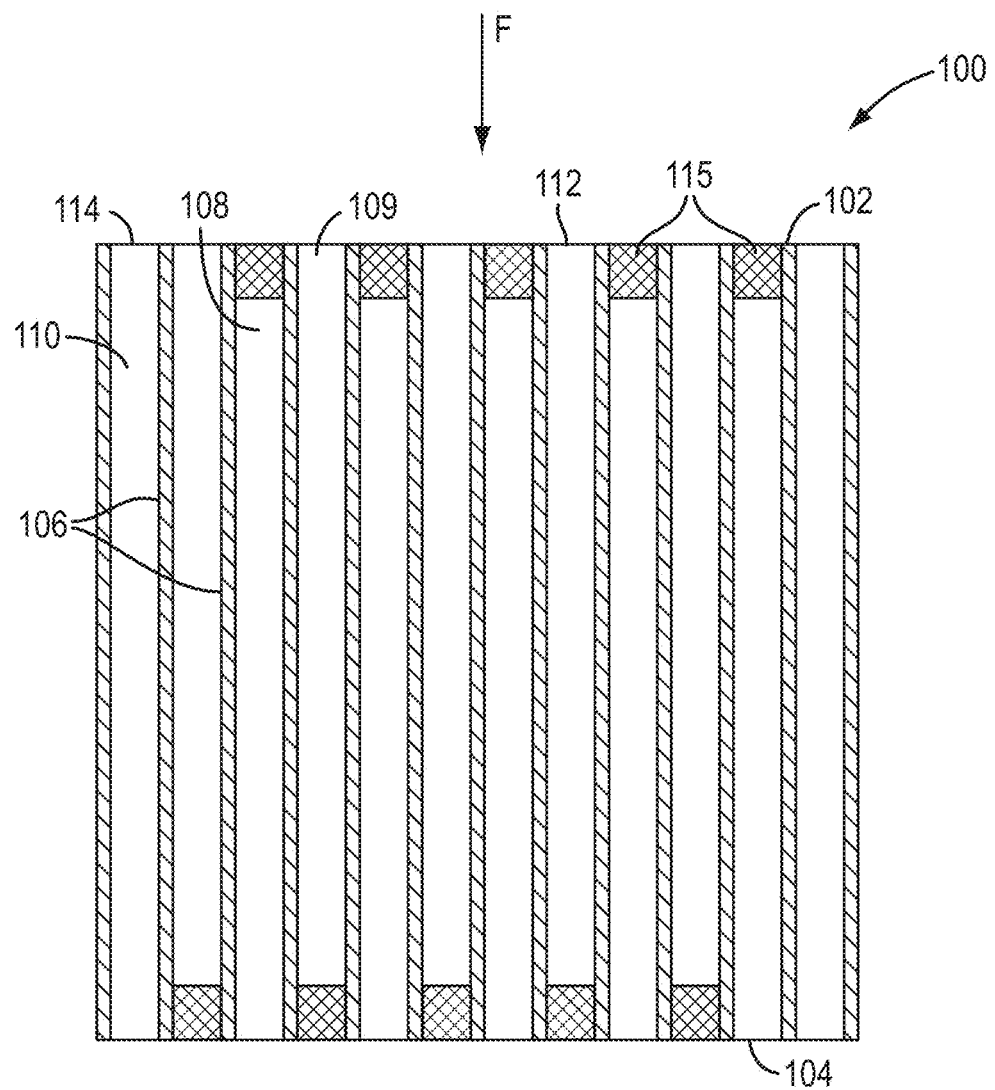
FIG. 2 is a schematic, vertical cross-sectional view of the particulate filter of FIG. 1 taken through line 2-2 in FIG. 1.

As depicted in the exemplary embodiment of FIGS. 1 and 2, the particulate filter 100 defines a filtration region 112 including a first group of channels and a bypass region 114 including a second group of channels; the regions 112 and 114 being separated by the dashed bold line in FIG. 1. The filtration region 112 has selectively plugged channel ends to provide a wall-flow region that allows for more intimate contact between the fluid stream and the porous walls 106 within region 112 and causes fluid flowing through the channels 108, 109 in the filtration region 112 to flow through the porous walls between those channels thereby trapping particulate matter therein. The second group of channels 110 making up the bypass region 114 includes channels with open channel ends to provide a flow-through region that allows the fluid stream to pass directly through the particulate filter 100 (i.e., substantially without causing the fluid flowing through the channels to pass through the porous walls 106 defining the channels within region 114).

FIG. 2 is a schematic cross-sectional view of the particulate filter 100 of FIG. 1 taken through line 2-2 depicting channels 108, 109 and 110 in the particulate filter 100. In the filtration region 112, alternate channels 108 and 109 are blocked with plugs 115 at opposite ends. In the exemplary embodiment of FIGS. 1 and 2, for example, the channels 108 are blocked by plugs 115 at the inlet end 102 of the filter 100 and the channels 109 are blocked by plugs 115 at the outlet end 104 of the filter 100. This blocking of the channels 108 and 109 forces fluid flowing through the channels 108 and 109 through the porous walls 106 within the region 112. Fluid flowing in the direction of arrow F enters the particulate filter 100 through channels 109 and 110 via the inlet end 102, but is blocked by plugs 115 in the channels 109 at the outlet end 104. That blockage causes a pressure build-up within the blocked channels 109 and forces the fluid to pass through the porous walls 106 of the channels 109. As the fluid is forced through the porous walls 106, particulate matter is trapped in the walls 106 while the fluid passes through unobstructed. The filtered fluid then enters the adjacent channels 108 and exits the particulate filter 100 through channels 108 via the outlet end 104. Fluid entering the channels 110 passes straight through the channels 110 unobstructed and exits the particulate filter 100 through channels 110 via the outlet end 104. Due to the respective sizes of the filtration region 112 and the bypass region 114, however, only a minimal amount of fluid initially enters channels 110 (i.e., when the filter is relatively clean) in comparison with the amount of fluid that enters channels 109.

When the particulate filter 100 is clean, the pressure drop resistance provided by the porous walls 106 is moderate, thereby allowing a significant fraction of fluid flow to take place through the filtration region 112, resulting in high initial filtration efficiency. As particulate matter is deposited within the filtration region 112 (i.e., trapped within walls 106), however, the pressure drop resistance to flow through the porous walls 106 becomes large enough to divert most of the flow to the bypass region 114, where fluid may flow straight through the channels 110, rather than passing through the porous walls 106, and exit the particulate filter 100 via the outlet end 104.

To maximize initial filtration efficiency, various exemplary embodiments of the present teachings contemplate that greater than or equal to about 70% of the plurality of parallel channels are plugged at an end thereof. In other words, in the exemplary embodiment of FIGS. 1 and 2, wherein all of the channels 108 and 109 of the filtration region 112 are plugged, the filtration region 112 may comprise greater than or equal to about 70% of the channels of the particulate filter 100 (i.e., a ratio of the plugged channels 108 and 109 to the total number of channels is greater than or equal to about 70%).

To minimize filtration efficiency at high soot loads, various exemplary embodiments of the present teachings further contemplate that at least 5% of the plurality of parallel channels are unplugged and completely bordered by channels that are also unplugged, thereby forming a contiguous region of through-channels (i.e. unplugged channels). Moreover, less than or equal to about 5% of the channels in the second group of channels are adjacent to plugged channels (i.e., in the exemplary embodiment of FIGS. 1 and 2, less than or equal to about 5% of the channels 110 are adjacent to the plugged channels 108 and 109).

The plugs 115 may be made of any suitable material, and are not limited to any particular plugging paste or material. In various exemplary embodiments, for example, in particular for filters made from cordierite, the plugs 115 may be formed from a cordierite grog used with binders and fillers. Exemplary plugs, for example, may also include a plugging paste consisting of a mixture of aluminum titnate powder, calcium aluminate powder, Kaowool® aluminosilicates fibers, silica sol, methyl cellulose binder and water, cured by heating.

Those having ordinary skill in the art will appreciate that the pattern of the plugged channels shown in FIGS. 1 and 2 and described above is exemplary only and that other arrangements of plugged channels may be utilized without departing from the scope of the present teachings. Moreover, those having ordinary skill in the art will appreciate that partial-flow configurations (i.e., where some channels of the filtration region 112 are plugged at one end and some channels of the filtration region 112 are open at both ends) also may be utilized without departing from the scope of the present teachings.

Figure 3:
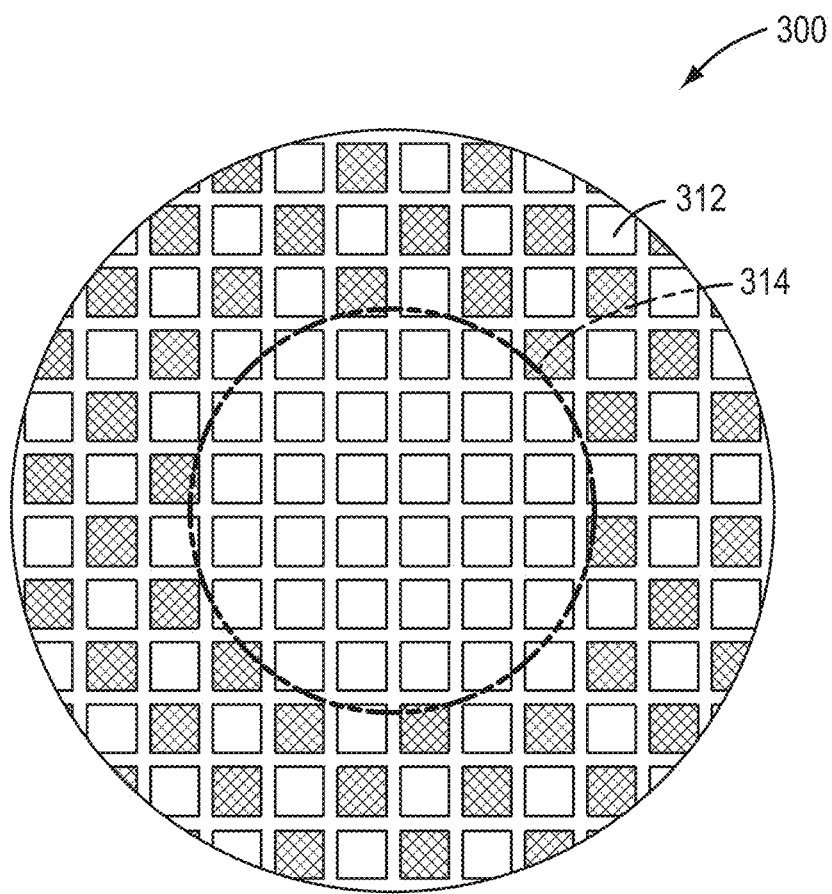
FIG. 3 is a top view of an additional exemplary embodiment of a particulate filter in accordance with the present teachings.

Those having ordinary skill in the art will further appreciate that the shape and/or configuration of the filtration region 112 and the bypass region 114 shown in FIGS. 1 and 2 are exemplary only and that other arrangements of channels may be utilized without departing from the scope of the present teachings. As illustrated in FIGS. 1 and 2, for example, various exemplary embodiments of the present teachings consider that the filtration region 112 and the bypass region 114 may be disposed concentrically relative to each other, wherein the bypass region 114 surrounds the filtration region 112. Consequently, in the exemplary embodiment of FIGS. 1 and 2, the peak flow velocity can be at the outer perimeter of the particulate filter 100. Whereas, as illustrated in FIG. 3, various additional exemplary embodiments of the present teachings consider a composite particulate filter 300 wherein a filtration region 312 surrounds a bypass region 314. Consequently, in various exemplary embodiments, peak flow velocity can also be at the center of the particulate filter.

Although in the exemplary embodiments of FIGS. 1-3, only a single filtration region and a single bypass region are depicted, the present teachings contemplate embodiments wherein a particulate filter includes more than one filtration region and/or more than one bypass region. Moreover, various arrangements of the one or more filtration regions and the one or more bypass regions are contemplated as within the scope of the present teachings and the configurations illustrated in FIGS. 1-3 are exemplary and non-limiting.

As discussed above, the geometric and porous wall structural properties of a particulate filter, such as, for example a particulate filter like the composite particulate filter 100 of FIGS. 1 and 2, can influence the particulate filter's filtration efficiency and pressure drop behavior with regard to particulate loading. As also discussed above and will be described in more detail below, a particulate filter that exhibits a low clean pressure drop and high initial filtration efficiency, followed by low filtration efficiency at high particulate loads, may avoid soot over-loading of the filter when active regeneration is not available.

Accordingly, the present teachings contemplate configuring a particulate filter with various geometric properties and porous wall microstructural properties in order to achieve the above desired pressure drop and filtration efficiencies. To study pressure drop and filtration efficiency performance as a function of filter geometry and microstructure, predictive models were developed and validated with laboratory experiments, as shown and described below with reference to FIG. 4 and Tables 1 and 2.

Figure 4:
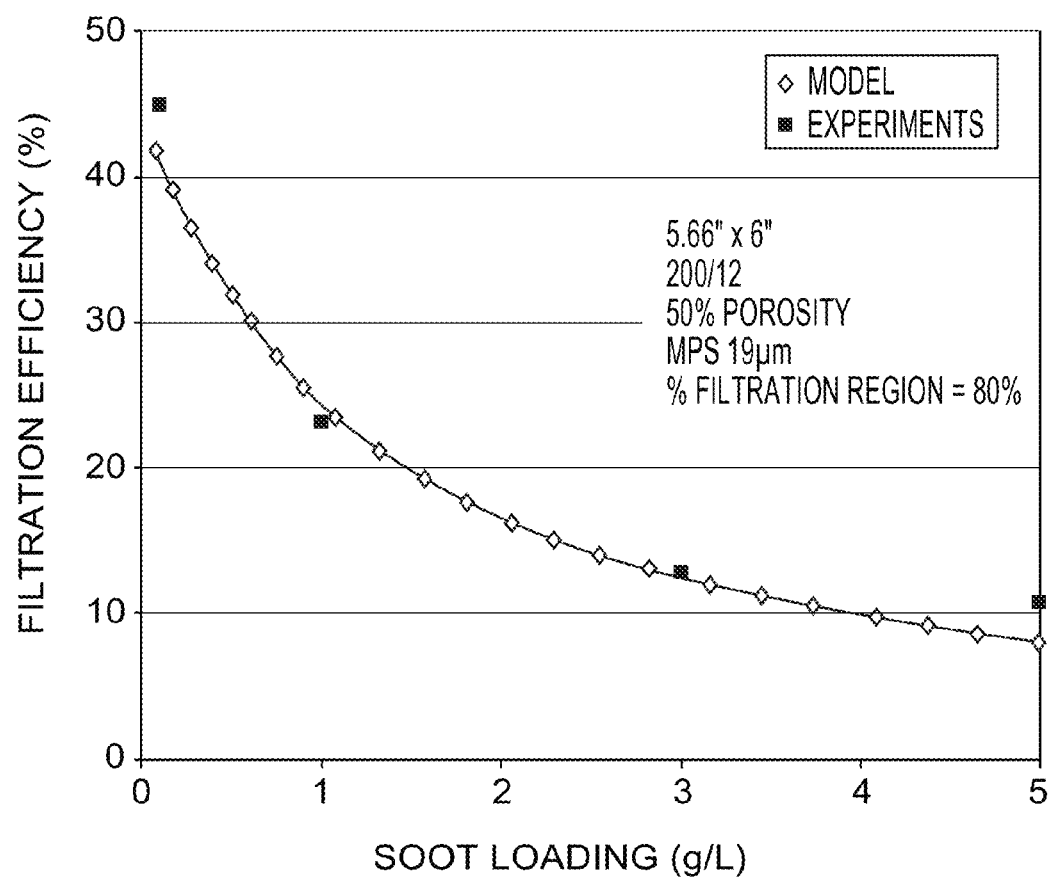
FIG. 4 compares results obtained from modeling data and experimental tests of filtration efficiency as a function of soot loading for a particulate filter in accordance with the present teachings.

FIG. 4, for example, shows results obtained from modeling data compared with results obtained from experimental tests of filtration efficiency (%) as a function of soot loading, measured in grams per liter (g/l). To obtain the results of FIG. 4, a particulate filter with a diameter of 5.66 inches and a length of 6 inches, having a cell density of 200 CPSI, a wall thickness of 12 mils (=$1/1000$ of an inch), a wall porosity of 50%, and a median pore size of 19 μm, was modeled and tested at a fluid flow rate of 75 kg/hr at 23° C. As shown by FIG. 4, in both the model and experimental tests, initial filtration efficiency (represented by about 0 g/l soot loading) decreased significantly with an increase in soot load, until at high soot loading levels (represented by about 5 g/l soot loading) filtration efficiency was only about 10%.

The predictive model also considered how fluid flow is distributed between the regions of the filter (i.e., the filtration region and the bypass region) for a given soot loading level depending on the relative flow resistance provided by each region. As discussed above, the flow distribution can dictate the total pressure drop and filtration efficiency of the particulate filter at any given soot loading level. As shown in FIG. 4, for example, when the filter is relatively clean (i.e., at soot loading ranging from about 0 g/l to less than about 0.5 g/l), the resistance provided by the plugged channels is moderate, therefore, a significant portion (i.e., greater than or equal to about 40%) of the flow takes place through the filtration region, resulting in a relatively high initial filtration efficiency (i.e., greater than or equal to about 40%). As the filter becomes dirty (i.e., loaded with soot), the pressure drop across the plugged channels increases, resulting in a decrease in the amount of flow through the filtration region, thereby decreasing the filtration efficiency. At high soot load levels (i.e., at soot loading of greater than or equal to about 5 g/l), the filtration efficiency can actually decrease low enough (i.e., less than or equal to about 10%) to allow most of the incoming soot (i.e., greater than or equal to about 90%) to bypass the filtration region completely by flowing instead through the bypass region of the filter.

Sensitivity of pressure drop and filtration efficiency to various filter geometries and microstructures is presented below in Table 1, for a particulate filter modeled at a fluid flow rate of 375 kg/hr at 590° C.

TABLE 1

Sensitivity of Filter Filtration Efficiency (FE) and Pressure Drop (dP) as a Function of Filter Geometry and Microstructure

| Diameter (inch.) | Length (inch.) | CPSI | Wall Thickness (mils) | Porosity (%) | MPS (um) | Filtration Region % Filter area | FE @ 0 g/l (%) | FE @ 5 g/l (%) | dP 0 g/l (kPa) | dP 5 g/l (kPa) |
|---|---|---|---|---|---|---|---|---|---|---|
| 5.66 | 9 | 275 | 8 | 60 | 15 | 100 | 100 | 100 | 6.62 | 13.5 |
| 5.66 | 9 | 275 | 8 | 60 | 15 | 90 | 67 | 41.3 | 5.55 | 8.4 |
| 5.66 | 9 | 275 | 8 | 60 | 15 | 80 | 47.9 | 20.6 | 4.93 | 6.69 |
| 5.66 | 9 | 275 | 8 | 60 | 15 | 70 | 35.2 | 10.7 | 4.49 | 5.79 |
| 5.66 | 6 | 275 | 8 | 60 | 15 | 100 | 100 | 100 | 5.49 | 15 |
| 5.66 | 6 | 275 | 8 | 60 | 15 | 90 | 65 | 28.2 | 4.62 | 7.4 |
| 5.66 | 6 | 275 | 8 | 60 | 15 | 80 | 46 | 12.3 | 4.1 | 5.66 |
| 5.66 | 6 | 275 | 8 | 60 | 15 | 70 | 33 | 5.9 | 3.84 | 4.9 |
| 7 | 9 | 275 | 8 | 60 | 15 | 100 | 100 | 100 | 4.31 | 8.57 |
| 7 | 9 | 275 | 8 | 60 | 15 | 90 | 67.6 | 41.2 | 3.4 | 5.27 |
| 7 | 9 | 275 | 8 | 60 | 15 | 80 | 48.2 | 20.6 | 3 | 4 |
| 7 | 9 | 275 | 8 | 60 | 15 | 70 | 35.2 | 10.7 | 2.74 | 3.48 |
| 7 | 6 | 275 | 8 | 60 | 15 | 100 | 100 | 100 | 3.38 | 9.66 |
| 7 | 6 | 275 | 8 | 60 | 15 | 90 | 65.8 | 28.2 | 2.82 | 4.58 |
| 7 | 6 | 275 | 8 | 60 | 15 | 80 | 46 | 12.4 | 2.52 | 3.43 |
| 7 | 6 | 275 | 8 | 60 | 15 | 70 | 33.4 | 5.9 | 2.31 | 2.91 |
| 5.66 | 9 | 200 | 8 | 60 | 15 | 100 | 100 | 100 | 4.79 | 13 |
| 5.66 | 9 | 200 | 8 | 60 | 15 | 90 | 66.5 | 30.5 | 3.99 | 6.66 |
| 5.66 | 9 | 200 | 8 | 60 | 15 | 80 | 46.2 | 13.6 | 3.56 | 4.9 |
| 5.66 | 9 | 200 | 8 | 60 | 15 | 70 | 34 | 6.6 | 3.23 | 4.2 |
| 5.66 | 6 | 200 | 8 | 60 | 15 | 100 | 100 | 100 | 4.1 | 16.4 |
| 5.66 | 6 | 200 | 8 | 60 | 15 | 90 | 63 | 18 | 3.4 | 5.6 |
| 5.66 | 6 | 200 | 8 | 60 | 15 | 80 | 43 | 7.3 | 3.1 | 4.1 |
| 5.66 | 6 | 200 | 8 | 60 | 15 | 70 | 30 | 3.4 | 2.8 | 3.6 |
| 5.66 | 9 | 350 | 8 | 60 | 15 | 100 | 100 | 100 | 9.1 | 15.1 |
| 5.66 | 9 | 350 | 8 | 60 | 15 | 90 | 68 | 48 | 7.8 | 10.7 |
| 5.66 | 9 | 350 | 8 | 60 | 15 | 80 | 49 | 26 | 6.9 | 8.8 |
| 5.66 | 9 | 350 | 8 | 60 | 15 | 70 | 36 | 14 | 6.3 | 7.8 |
| 5.66 | 6 | 350 | 8 | 60 | 15 | 100 | 100 | 100 | 7.5 | 15.5 |
| 5.66 | 6 | 350 | 8 | 60 | 15 | 90 | 67 | 37 | 6.5 | 9.5 |
| 5.66 | 6 | 350 | 8 | 60 | 15 | 80 | 47 | 17 | 5.8 | 7.5 |
| 5.66 | 6 | 350 | 8 | 60 | 15 | 70 | 34 | 9 | 5.4 | 6.7 |
| 5.66 | 9 | 275 | 10 | 60 | 15 | 100 | 100 | 100 | 7.9 | 15.6 |
| 5.66 | 9 | 275 | 10 | 60 | 15 | 90 | 67 | 42 | 6.7 | 10 |
| 5.66 | 9 | 275 | 10 | 60 | 15 | 80 | 48 | 21 | 5.9 | 8 |
| 5.66 | 9 | 275 | 10 | 60 | 15 | 70 | 35 | 11 | 5.4 | 6.8 |
| 5.66 | 6 | 275 | 10 | 60 | 15 | 100 | 100 | 100 | 6.6 | 17 |
| 5.66 | 6 | 275 | 10 | 60 | 15 | 90 | 65 | 29 | 5.6 | 8.8 |
| 5.66 | 6 | 275 | 10 | 60 | 15 | 80 | 46 | 13 | 5 | 6.8 |
| 5.66 | 6 | 275 | 10 | 60 | 15 | 70 | 33 | 6 | 4.6 | 6 |
| 5.66 | 9 | 275 | 12 | 60 | 15 | 100 | 100 | 100 | 9.5 | 18 |
| 5.66 | 9 | 275 | 12 | 60 | 15 | 90 | 67 | 43 | 8 | 11.9 |
| 5.66 | 9 | 275 | 12 | 60 | 15 | 80 | 48 | 22 | 7.1 | 9.6 |
| 5.66 | 9 | 275 | 12 | 60 | 15 | 70 | 35 | 11 | 6.5 | 8.4 |
| 5.66 | 6 | 275 | 12 | 60 | 15 | 100 | 100 | 100 | 7.9 | 19.8 |
| 5.66 | 6 | 275 | 12 | 60 | 15 | 90 | 65 | 30 | 6.8 | 10.5 |
| 5.66 | 6 | 275 | 12 | 60 | 15 | 80 | 45 | 13 | 6 | 8.2 |
| 5.66 | 6 | 275 | 12 | 60 | 15 | 70 | 33 | 6 | 5.6 | 7.2 |
| 5.66 | 9 | 275 | 8 | 50 | 15 | 100 | 100 | 100 | 6.7 | 13.6 |
| 5.66 | 9 | 275 | 8 | 50 | 15 | 90 | 67 | 41 | 5.6 | 8.5 |
| 5.66 | 9 | 275 | 8 | 50 | 15 | 80 | 48 | 21 | 5 | 6.7 |
| 5.66 | 9 | 275 | 8 | 50 | 15 | 70 | 35 | 11 | 4.5 | 5.8 |
| 5.66 | 6 | 275 | 8 | 50 | 15 | 100 | 100 | 100 | 5.5 | 15.2 |
| 5.66 | 6 | 275 | 8 | 50 | 15 | 90 | 65 | 28 | 4.6 | 7.4 |
| 5.66 | 6 | 275 | 8 | 50 | 15 | 80 | 45 | 12 | 4.2 | 5.7 |
| 5.66 | 6 | 275 | 8 | 50 | 15 | 70 | 33 | 6 | 3.8 | 4.9 |
| 5.66 | 9 | 275 | 8 | 40 | 15 | 100 | 100 | 100 | 6.7 | 13.6 |
| 5.66 | 9 | 275 | 8 | 40 | 15 | 90 | 67 | 41 | 5.6 | 8.5 |
| 5.66 | 9 | 275 | 8 | 40 | 15 | 80 | 48 | 20 | 4.9 | 6.7 |
| 5.66 | 9 | 275 | 8 | 40 | 15 | 70 | 35 | 11 | 4.5 | 5.8 |
| 5.66 | 6 | 275 | 8 | 40 | 15 | 100 | 100 | 100 | 5.6 | 15.3 |
| 5.66 | 6 | 275 | 8 | 40 | 15 | 90 | 65 | 28 | 4.7 | 7.4 |
| 5.66 | 6 | 275 | 8 | 40 | 15 | 80 | 45 | 12 | 4.2 | 5.7 |
| 5.66 | 6 | 275 | 8 | 40 | 15 | 70 | 32 | 6 | 3.9 | 4.9 |
| 5.66 | 9 | 275 | 8 | 60 | 10 | 100 | 100 | 100 | 7 | 13.9 |
| 5.66 | 9 | 275 | 8 | 60 | 10 | 90 | 66 | 41 | 5.7 | 8.6 |
| 5.66 | 9 | 275 | 8 | 60 | 10 | 80 | 46 | 20 | 5 | 6.7 |
| 5.66 | 9 | 275 | 8 | 60 | 10 | 70 | 33 | 11 | 4.6 | 5.8 |
| 5.66 | 6 | 275 | 8 | 60 | 10 | 100 | 100 | 100 | 6 | 15.6 |

TABLE 1-continued

Sensitivity of Filter Filtration Efficiency (FE) and Pressure Drop (dP)
as a Function of Filter Geometry and Microstructure

| Diameter (inch.) | Length (inch.) | CPSI | Wall Thickness (mils) | Porosity (%) | MPS (um) | Filtration Region % Filter area | FE @ 0 g/l (%) | FE @ 5 g/l (%) | dP 0 g/l (kPa) | dP 5 g/l (kPa) |
|---|---|---|---|---|---|---|---|---|---|---|
| 5.66 | 6 | 275 | 8 | 60 | 10 | 90 | 62 | 27 | 4.9 | 7.5 |
| 5.66 | 6 | 275 | 8 | 60 | 10 | 80 | 42 | 12 | 4.3 | 5.7 |
| 5.66 | 6 | 275 | 8 | 60 | 10 | 70 | 30 | 6 | 3.9 | 4.9 |

Consequently, the present teachings contemplate particulate filters configured with various geometric properties and porous wall microstructural properties, such that filtration efficiency (FE) of the particulate filter, for example, is greater than or equal to about 30%, greater than equal to about 40%, or greater than or equal to about 50% at soot load levels ranging from about 0 g/l to less than about 0.5 g/l. And the present teachings further contemplate particulate filters configured with various geometric properties and porous wall microstructural properties, such that filtration efficiency (FE) of the particulate filter, for example, is less than or equal to about 25%, less than or equal to about 15%, or less than or equal to about 10% at soot load levels of greater than or equal to about 5 g/l. In other words, the present teachings contemplate particulate filters, wherein the particulate filter defines a filtration region including a first group of channels and a bypass region including a second group of channels, wherein the particulate filter has a filtration efficiency (FE) of less than or equal to about 25% at soot load levels of the particulate filter of greater than or equal to about 5 g/l.

The present teachings, therefore, further contemplate particulate filters wherein the particulate filter defines a filtration region including a first group of channels and a bypass region including a second group of channels, wherein the particulate filter is configured such that a majority of the fluid flowing through the particulate filter flows through the filtration region at particulate matter load levels of the particulate filter ranging from about 0 g/l to less than about 0.5 g/l and a majority of the fluid flowing through the particulate filter flows through the bypass region at particulate matter load levels of the particulate filter of greater than or equal to about 5 g/l.

While the exact choice of filter microstructure and geometry is specific to a filter's application and, for example, engine system design, as shown in Table 1, filtration efficiency generally increases with increasing filtration region area fraction (i.e., decreasing bypass region area fraction), decreasing length, lower CPSI, decreasing channel wall thickness, increasing wall porosity and increasing pore size. Consequently, as described above, in order to provide particulate filters that exhibit such filtration efficiencies (i.e., high initial filtration efficiency, followed by low filtration efficiency at high particulate loads), the present teachings further contemplate particulate filters wherein the particulate filter defines at least one filtration region including a first group of channels and at least one bypass region including a second group of channels, wherein greater than or equal to about 70% of the plurality of parallel channels are plugged at an end thereof.

The present teachings additionally contemplate methods for filtering particulate matter that utilize such particulate filter configurations, such as, for example, a particulate filter like the particulate filter 100 of FIGS. 1 and 2. Methods in accordance with the present teachings may comprise, for example, flowing a fluid (e.g., exhaust gas) through a particulate filter 100 comprising an inlet end 102, an outlet end 104, and a plurality of parallel channels 108, 109 and 110 disposed and configured to flow the fluid from the inlet end 102 to the outlet end 104. The channels 108, 109 and 110 being defined by a plurality of porous walls 106 configured to trap particulate matter. The majority of the fluid may flow through the filtration region 112 of the particulate filter 100 when the particulate filter 100 has a particulate matter load level ranging from about 0 g/l to less than about 0.5 WI, while the majority of the fluid may flow through the bypass region 114 of the particulate filter 100 when the particulate filter 100 has a particulate matter load level of greater than or equal to about 5 g/l.

Those having ordinary skill in the art would understand that the results and corresponding geometrical and microstructural properties shown and described with reference to FIG. 4 and Table 1 are exemplary only and not intended to be limiting of the scope of the present teachings or claims. For example, the properties of the fluid stream entering the structure, such as, for example, temperature, pressure, concentration of contaminants and/or other substances in the fluid, and flow rate (both into, through and out of the system), may also present factors to consider to select a filter's geometric and microstructural properties in accordance with the present teachings. Accordingly, those skilled in the art will understand that the particulate filters of the present teachings may include a plurality of geometrical and micro-structural parameters that achieve a low clean pressure drop and high initial filtration efficiency, followed by low filtration efficiency at high particulate loads.

Various exemplary embodiments of the present teachings contemplate, for example, a composite particulate filter, wherein the filtration region has a cell density (CPSI) that differs from a cell density of the bypass region. Sensitivity of pressure drop and filtration efficiency to varying CPSI in the bypass region is presented below in Table 2, for a particulate filter with a diameter of 5.66 inches and a length of 6 inches, having a 275 CPSI in the filtration region, a wall thickness of 8 mils, a wall porosity of 60%, and a median pore size of 15 μm, modeled at a fluid flow rate of 375 kg/hr at 590° C.

TABLE 2

Sensitivity of Filter Filtration Efficiency (FE) and Pressure Drop (dP)
as a Function of Varying CPSI in the Bypass Region

| By-pass Region CPSI | Region I % Filter area | FE @ 0 g/l (%) | FE @ 5 g/l (%) | dP 0 g/l (kPa) | dP 5 g/l (kPa) |
|---|---|---|---|---|---|
| 350 | 90 | 72 | 36 | 4.8 | 8.5 |
| 350 | 80 | 54 | 16 | 4.4 | 6.5 |
| 350 | 70 | 41 | 8 | 4.1 | 5.6 |
| 200 | 90 | 56 | 21 | 4.3 | 6.2 |

TABLE 2-continued

Sensitivity of Filter Filtration Efficiency (FE) and Pressure Drop (dP) as a Function of Varying CPSI in the Bypass Region

| By-pass Region CPSI | Region I % Filter area | FE @ 0 g/l (%) | FE @ 5 g/l (%) | dP 0 g/l (kPa) | dP 5 g/l (kPa) |
|---|---|---|---|---|---|
| 200 | 80 | 36 | 9 | 3.8 | 4.8 |
| 200 | 70 | 25 | 4 | 3.5 | 4.3 |

Various additional exemplary embodiments of the present teachings further contemplate a particulate filter, wherein a thickness of the porous walls (mils) in the filtration region differs from a thickness of the porous walls in the bypass region.

Other characteristics of the particulate filters of the present teachings may also be altered as desired, including the materials used for the structures, the structural configuration (e.g., dimensions, shapes, etc.) of the channels, and/or properties of the fluid stream entering the structure, such as, for example, temperature, pressure, concentration of contaminants and/or other substances in the fluid, and flow rate (including into, through and out of the system). Ordinarily skilled artisans will understand that based on various parameters of the overall after-treatment system operation and of the fluid stream for which treatment is desired at least some of the various characteristics and features described above may be selected so as to help achieve the required pressure drop and filtration efficiency behavior.

Various exemplary embodiments of the present teachings contemplate, for example, a particulate filter, wherein a hydraulic diameter of the channels at the inlet end differs from a hydraulic diameter of the channels at the outlet end.

Overall, however, based on the present teachings, those having skill in the art would understand how to modify a composite filter's properties, including, for example, its geometric and microstructural properties, to achieve the desired low clean pressure drop and high initial filtration efficiency, followed by low filtration efficiency at high particulate loads.

Further, although various exemplary embodiments of the present teachings refer to particulate filters used to filter ash and soot particulate matter from automobile exhaust, the present teachings encompass a wide range of filters useful in various applications and for filtering various types of particulate matters. Exemplary applications include, but are not limited to, for example, filters for use in coal combustion power plants, gasoline engines, and for stationary and non-stationary applications.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It should be understood that while the invention has been described in detail with respect to various exemplary embodiments thereof, it should not be considered limited to such, as numerous modifications are possible without departing from the broad scope of the appended claims.

We claim:

1. A particulate filter, comprising:
an inlet end, an outlet end, and a plurality of parallel channels disposed and configured to flow fluid from the inlet end to the outlet end, the channels being defined by a plurality of porous walls configured to trap particulate matter,
wherein the particulate filter defines at least one filtration region including a first group of channels and at least one bypass region including a second group of channels,
wherein at least some of the channels in the first group of channels are plugged at an end thereof,
wherein the channels in the second group of channels are unplugged,
wherein less than or equal to about 5% of the channels in the second group are adjacent to channels that are plugged, and
wherein greater than or equal to about 70% of the plurality of parallel channels are plugged at an end thereof;
and further wherein at least one of the following conditions are satisfied:
(i) the at least one filtration region has a cell density that differs from a cell density in the at least one bypass region, and
(ii) the at least one filtration region has a thickness of the porous walls that differs from a thickness of the porous walls in the at least one bypass region.

2. The particulate filter of claim 1, wherein at least 5% of the plurality of parallel channels are unplugged and completely bordered by channels that are unplugged.

3. The particulate filter of claim 1, wherein the particulate filter has a honeycomb structure.

4. The particulate filter of claim 1, wherein the porous walls are configured to trap soot.

5. The particulate filter of claim 1, wherein the channels in the first group of channels are alternately plugged at the inlet end and the outlet end.

6. The particulate filter of claim 1, wherein the filtration region and the bypass region are disposed concentrically relative to each other.

7. The particulate filter of claim 6, wherein the bypass region surrounds the filtration region.

8. The particulate filter of claim 6, wherein the filtration region surrounds the bypass region.

9. The particulate filer of claim 1, wherein the porous walls are configured to trap soot and wherein the particulate filter has a filtration efficiency (FE) that is greater than or equal to about 30% at soot load levels of the particulate filter of about 0 g/l.

10. The particulate filter of claim 9, wherein the filtration efficiency (FE) is greater than or equal to 40% at soot load levels of the particulate filter of about 0 g/l.

11. The particulate filter of claim 10, wherein the filtration efficiency (FE) is greater than or equal to 50% at soot load levels of the particulate filter of about 0 g/l.

12. The particulate filter of claim 1, wherein the porous walls are configured to trap soot and wherein the particulate filter has a filtration efficiency (FE) of less than or equal to about 25% at soot load levels of the particulate filter of greater than or equal to about 5 g/l.

13. The particulate filter of claim 12, wherein the filtration efficiency (FE) is less than or equal to about 15% at soot load levels of the particulate filter of greater than or equal to about 5 g/l.

14. The particulate filter of claim 13, wherein the filtration efficiency (FE) is less than or equal to about 10% at soot load levels of the particulate filter of greater than or equal to about 5 g/l.

15. The particulate filter of claim 1, wherein a hydraulic diameter of the channels at the inlet end differs from a hydraulic diameter of the channels at the outlet end.

16. The particulate filter of claim 1, wherein the first group of channels is a contiguous group of channels and the second group of channels is a contiguous group of channels.

17. The particulate filter of claim 1, wherein the particulate filter is configured such that a majority of the fluid flowing through the particulate filter flows through the filtration region at particulate matter load levels of the particulate filter ranging from about 0 g/l to less than about 0.5 g/l and a majority of the fluid flowing through the particulate filter flows through the bypass region at particulate matter load levels of the particulate filter of greater than or equal to about 5 g/l.

18. A method of filtering particulate matter comprising:
flowing fluid through a particulate filter comprising an inlet end, an outlet end, and a plurality of parallel channels disposed and configured to flow fluid from the inlet end to the outlet end, the channels being defined by a plurality of porous walls configured to trap particulate matter,
wherein a majority of the fluid flows through at least one first region of the particulate filter when the particulate filter has a particulate matter load level ranging from about 0 g/l to less than about 0.5 g/l, and
wherein a majority of the fluid flows through at least one second region of the particulate filter that differs from the at least one first region when the particulate filter has a particulate matter load level of greater than or equal to about 5 g/l.

19. The method of claim 18, wherein fluid flowing through the at least one first region flows through a first group of channels including at least some channels that are plugged at one end thereof.

20. The particulate filter of claim 18, wherein the channels in the first group of channels are alternately plugged at the inlet end and the outlet end.

21. The method of claim 18, wherein fluid flowing through the at least one second region flows through a second group of channels that are unplugged.

22. The method of claim 18, wherein at least some of the fluid flowing through the at least one first region passes through porous walls in the at least one first region.

23. The method of claim 18, wherein fluid flowing through the at least one second region passes primarily from the inlet end to the outlet end of the particulate filter without passing through the porous walls of the at least one second region.

* * * * *